(12) United States Patent
Sayers et al.

(10) Patent No.: US 9,798,760 B2
(45) Date of Patent: Oct. 24, 2017

(54) APPLICATION RETENTION METRICS

(75) Inventors: Craig Peter Sayers, Menlo Park, CA (US); Shyam Sundar Rajaram, San Francisco, CA (US)

(73) Assignee: ENTIT SOFTWARE LLC, Sunnyvale, CA (US)

(*) Notice: Subject to any disclaimer, the term of this patent is extended or adjusted under 35 U.S.C. 154(b) by 451 days.

(21) Appl. No.: 14/372,874

(22) PCT Filed: Apr. 27, 2012

(86) PCT No.: PCT/US2012/035432
§ 371 (c)(1),
(2), (4) Date: Jul. 17, 2014

(87) PCT Pub. No.: WO2013/162593
PCT Pub. Date: Oct. 31, 2013

(65) Prior Publication Data
US 2014/0337304 A1    Nov. 13, 2014

(51) Int. Cl.
  *G06F 17/30* (2006.01)
  *G06Q 30/06* (2012.01)
(52) U.S. Cl.
  CPC ....... *G06F 17/30371* (2013.01); *G06Q 30/06* (2013.01)
(58) Field of Classification Search
  None
  See application file for complete search history.

(56) References Cited

U.S. PATENT DOCUMENTS

| | | | |
|---|---|---|---|
| 8,499,063 B1 * | 7/2013 | Satish | G06F 8/62 709/220 |
| 2006/0041500 A1 | 2/2006 | Diana et al. | |

(Continued)

FOREIGN PATENT DOCUMENTS

KR    10-2011-0065103 A    6/2011

OTHER PUBLICATIONS

International Search Report and Written Opinion of the International Searching Authority, mailed Jan. 3, 2013; issued in related PCT Application No. PCT/US2012/035432.

(Continued)

*Primary Examiner* — Anh Tai Tran (57) ABSTRACT

The disclosure relates to methods and systems for generating application retention metrics. In one aspect, a method for generating coupled application retention metrics is disclosed. First and second reference application identifiers are selected (230), and a coupled application retention metric between the first and second reference application identifiers is generated (330). The coupled retention metric is generated by querying (100) an application database including a plurality of application records, where each record includes an application identifier, a user identifier, and retention information. Retention metrics in the application database are compared for application identifiers corresponding to the first or second reference application identifier and having a common user identifier. An application of interest is selected by and its identifier is received (200) from a user of a remote application, where the selected application corresponds to the first reference application identifier. The coupled application retention metric is transmitted (430) to the user.

11 Claims, 10 Drawing Sheets

(56) References Cited

U.S. PATENT DOCUMENTS

| | | | |
|---|---|---|---|
| 2007/0233782 A1* | 10/2007 | Tali | G06F 8/61 709/203 |
| 2008/0004990 A1 | 1/2008 | Flake et al. | |
| 2008/0154741 A1 | 6/2008 | Flake et al. | |
| 2011/0225291 A1 | 9/2011 | Dobroth et al. | |
| 2011/0307340 A1 | 12/2011 | Benmbarek | |
| 2012/0021774 A1 | 1/2012 | Mehta et al. | |

OTHER PUBLICATIONS

Perez, S.; "26% of Mobile Apps Used Just Once"; issued: Feb. 1, 2011; http://www.readwriteweb.com/mobile/2011/02/26-percent-of-mobile-apps-used-just-once.p.

Qiang Xu, et al., "Identifying Diverse Usage Behaviors of Smartphone Apps," IMC (2011).

"Measuring the Success of your Mobile Strategy", White Paper Published by: Webtrends, published Jun. 2, 2010, 7 pages.

* cited by examiner

FIG. 1A

Application Database 100

| Application Identifier | User Identifier | Retention Information | Other Information |
|---|---|---|---|
| App. Field 1 | User Field 1 | Ret. Field 1 | Other Field 1 |
| App. Field 2 | User Field 2 | Ret. Field 2 | Other Field 2 |
| App. Field 3 | User Field 3 | Ret. Field 3 | Other Field 3 |
| ⋮ | ⋮ | ⋮ | ⋮ |
| App. Field $N_A$ | User Field $N_U$ | Ret. Field $N_R$ | Other Field $N_O$ |

*FIG. 1B*

(User) Application Database 102

| Application Identifier | User Identifier | Retention Information |
|---|---|---|
| Application ID | User ID | Install Time |
|  | Device ID | Delete Time |

*FIG. 1C*

(Transaction) Application Database 104

| Application Identifier | User Identifier | Retention Information | Other Information |
|---|---|---|---|
| Application ID | User ID | Transaction Type | Transaction ID |
|  | Device ID | Transaction Time |  |

*FIG. 1D*

| Record | User | Application | Installed | Deleted |
|--------|------|-------------|-----------|---------|
| 1 | $U_1$ | $A_1$ | Y | N |
| 2 | $U_1$ | $A_2$ | Y | N |
| 3 | $U_1$ | $A_3$ | Y | N |
| 4 | $U_2$ | $A_1$ | Y | N |
| 5 | $U_2$ | $A_2$ | Y | N |
| 6 | $U_2$ | $A_3$ | Y | Y |
| 7 | $U_3$ | $A_1$ | Y | N |
| 8 | $U_3$ | $A_2$ | Y | Y |
| 9 | $U_3$ | $A_3$ | Y | Y |

|  | $A_2$ Retained | |
|---|---|---|
| $A_1$ Retained | Y | N |
| Y | Complementary (510) | Competitive (520) |
| N | Competitive (530) | Complementary (540) |

*FIG. 5A*

| Record | User | Application | Installed | Deleted |
|---|---|---|---|---|
| 1 | $U_1$ | $A_1$ | Y | N |
| 2 | $U_1$ | $A_3$ | Y | N |
| 3 | $U_1$ | $A_4$ | Y | Y |
| 4 | $U_2$ | $A_1$ | Y | Y |
| 5 | $U_2$ | $A_2$ | Y | Y |
| 6 | $U_3$ | $A_1$ | Y | Y |
| 7 | $U_3$ | $A_2$ | Y | N |
| 8 | $U_4$ | $A_1$ | Y | N |
| 9 | $U_4$ | $A_2$ | Y | Y |
| 10 | $U_5$ | $A_1$ | Y | N |
| 11 | $U_5$ | $A_2$ | Y | N |
| 12 | $U_5$ | $A_4$ | Y | Y |

*FIG. 5B*

|  | $A_2$ Retained | |
|---|---|---|
| $A_1$ Retained | Y | N |
| Y | 25% (510) | 25% (520) |
| N | 25% (530) | 25% (540) |

APPLICATION RETENTION METRICS

BACKGROUND

Applications for download and/or purchase in an application content catalog environment may be accompanied by a metric to assist users in selecting applications. Metrics can include user reviews, user ratings, number of downloads, related applications downloaded by other users, etc.

DESCRIPTION OF THE DRAWINGS

The following detailed description of the various disclosed methods, processes, systems, and apparatus refers to the accompanying drawings in which.

DETAILED DESCRIPTION

Applications for download and/or purchase in an application content catalog environment may be accompanied by a metric to assist users in selecting applications. Metrics can include user reviews/ratings, number of downloads, related applications downloaded by other users, etc.

Such metrics, however, can have shortcomings that may limit the quality/usefulness of the information provided and that may not allow the user to make an informed decision for an application download/purchase selection best suiting a user's needs. For example, application ratings (e.g., on a selected numerical scale such as 0 to 10) are voluntarily provided by users, so the ratings generally represent a small subset of the total user population. Further, there may be a propensity for bias in the voluntary ratings (e.g., only users with strong negative and/or positive opinions tend to submit reviews). A download metric (e.g., for the application itself or for related applications) also can be misleading, in particular for free applications, as the metric does not reflect whether or to what extent the application is used by the user.

The disclosure relates to methods and systems for generating application retention metrics on a suitably programmed processor or computing device to assist users in selecting applications for download/purchase based on actual retention information that may be more indicative of application quality and usage as compared to the common metrics described above.

A centralized application database includes one or more retention metrics/information items for a given application and user combination. In one example, a user (e.g., application catalog user) selects an application of interest and may receive a retention metric for the application. Additional retention metrics may be provided for related applications in a side-by-side comparison, either based on user selection or automated selection by the application catalog of the related application(s).

In an extension, a coupled retention metric (or migration metric) may be generated between the application of interest and a related application based on a common user pool. The coupled retention metric may identify useful relationships, such as linear or concurrent migration/upgrade patterns, positive or negative competitive relationships, and positive or negative complementary relationships between two or more applications. The coupled retention metric provides more useful information to the user and allows the application catalog to provide more useful suggestions to the user when considering the applications for download/purchase.

The application retention metrics disclosed herein provide several advantages to both application users and developers as compared to commonly reported metrics. The disclosed retention metrics may be computed based on the entire installed user base along with additional objective filters/weighting factors (if desired), thus increasing the sample size and corresponding reliability for metric determination (e.g., eliminating deficiencies related to voluntary, potentially biased/subjective rating submissions). The retention metrics include information related to both application installation and un-installation/deletion, so the resulting metric is more representative of application usage as compared to a download counter. The retention metrics generated are easy for users to understand, so they provide more useful information to a broad potential user base in a tractable form. The retention metrics also may be useful to developers, as the metrics provide a way for developers to distinguish their applications from those of other developers in a manner easily understood by users. The retention metrics also may provide a way for developers to objectively evaluate the relative competitive quality of their applications and the applications of other developers, in particular because the retention metrics are generated based on information that a given developer generally does not possess (e.g., user behavior with respect to applications other than those of the given developer).

Figure 1A:
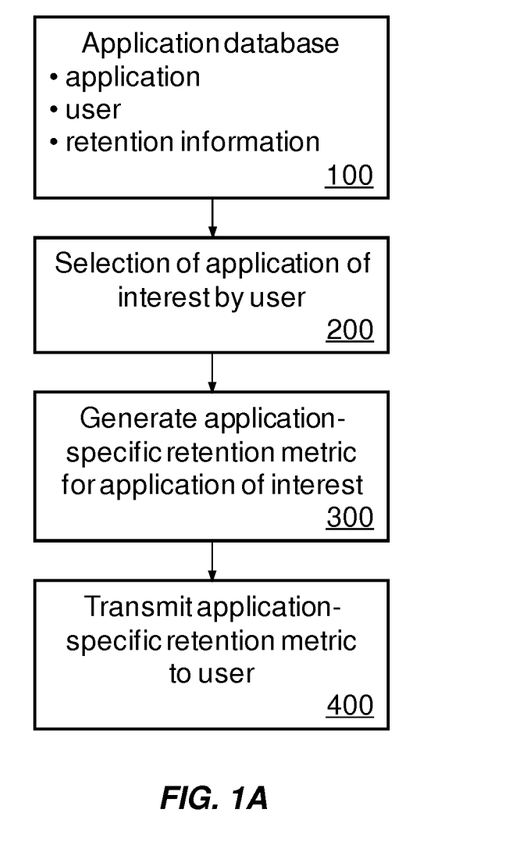
FIG. 1A is a flowchart illustrating an embodiment of a method for determining an application-specific retention metric according to the disclosure.

FIG. 1A is a flowchart and provides an overview of a method for determining an application-specific retention metric according to the disclosure. An application database 100 includes a plurality of application records. For example, the application database 100 may be a centralized database managed by an application content provider such a web- or internet-based application catalog that provides access to a variety of software applications for download or purchase by a user (e.g., a user having a computing device with an applicable operating system and/or hardware for the available applications).

Figure 1B:
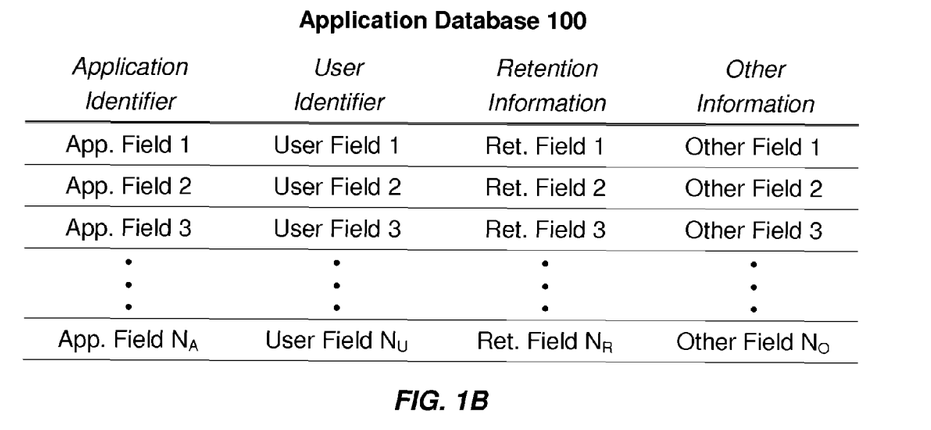
FIG. 1B is an illustration of a generic application database according to the disclosure

Each application record in the database 100 includes an application identifier, user identifier, and at least one retention information item for the given application-user combination. As illustrated in FIG. 1B, each of the application identifier, user identifier, and retention information may independently have a single data field (e.g., application field 1, user field 1, and retention field 1), or multiple data fields (e.g., up to application field $N_A$, user field $N_U$, and retention field $N_R$, where $N_A$, $N_U$, and $N_R$ may be the same or different) associated with the information item to provide any desired level of information detail. As further shown, other data items of interest (e.g., up to other field $N_O$) may be stored in the application database 100.

The application identifier may be any suitable identifier that uniquely identifies an available application (e.g., application name, developer, release number, version number, and/or some unique index corresponding to a combination of the foregoing application properties). For instance, in the illustration of FIG. 1B, the application identifier may include a unique application identifier ("application ID") as application field 1, an application name as application field 2, an application version as application field 3, etc.

The user identifier similarly may be any suitable identifier that uniquely identifies a user who has previously downloaded/installed the particular application associated with the application record/application identifier (e.g., a user identifier corresponding to a specific user/person/entity, a specific user account, a specific hardware device with the application). The unique user identifier additionally may be associated with other information related to a particular user, for example including at least one item of demographic information (e.g., age, gender, family status, education, occupation, general geographic location such as city, state, country, or region(s) thereof), and/or at least one item of usage information (e.g., hardware platform, operating system/version). For instance, in the illustration of FIG. 1B, the user identifier may include a unique user identifier ("user ID") as user field 1, an device identifier ("device ID") as user field 2, an operating system as user field 3, a user geographic location as user field 4, etc.

The retention information may include any data item or items related to whether a particular application has been installed/retained by a user. For example, the retention information may be a logical value to indicate whether the user has installed the application at some point and currently still retains the installed application (e.g., with the logical value stored as retention field 1). This information may be used to report a retention metric as a collective fraction or number of users having tried and retained the application as compared to those having tried and deleted the application. Suitably, the retention information may include a time component so that more detailed retention metric statistics may be computed. For example, the retention information stored in the application database 100 may include an installation date/time as well as a de-installation/deletion date/time (where applicable) for a given application-user combination (e.g., with the installation date/time stored as retention field 1, the de-installation date/time stored as retention field 2). The absence of a de-installation date indicates that the particular user has installed the application and currently retains the application on his/her computing device. Similarly, the presence of the de-installation date indicates that the particular user has installed but subsequently deleted the application from his/her computing device. In both instances, a time element may be associated with a given application-user combination for determination of a resulting retention metric (e.g., retained for at least a specified number of days, deleted after a specified number of days). Since a single user may re-install previously-deleted applications any number of times, the database may contain a transaction history of all installations and deletions, or, in a simpler implementation, only the most recent installation. In addition, a single user may have more than one device, or a single device may have multiple users. In these cases, the metrics may be computed per-user, per-device, or aggregated using additional information, for example per-household, or per-company.

Figure 1C:
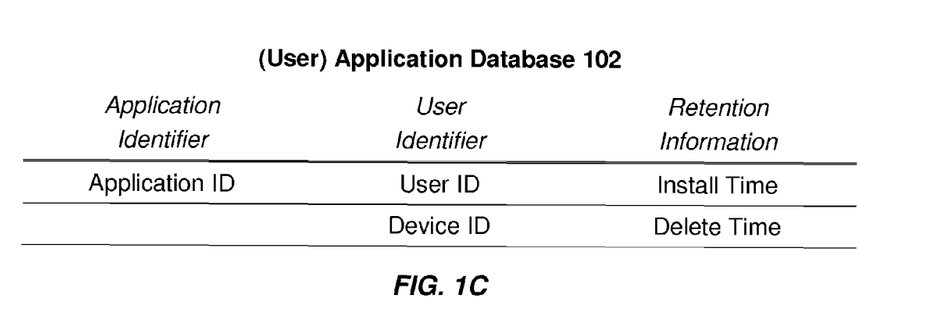
FIGS. 1C to 1E are illustrations of example application databases according to the disclosure.
Figure 1D:
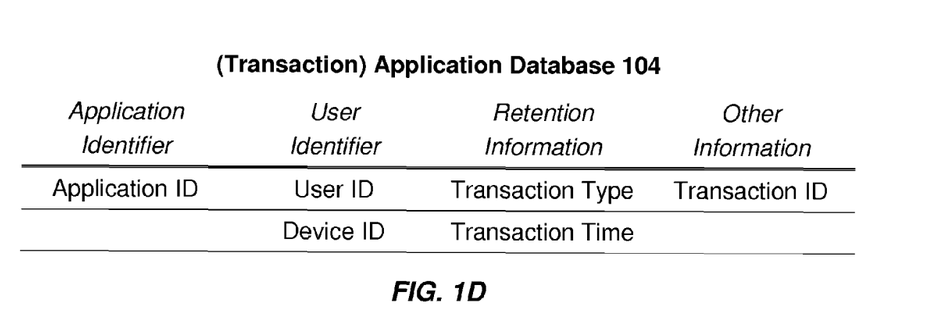

FIGS. 1C and 1D illustrate further examples of the application database 100. In FIG. 1C, a user-based input model for the application database 100 may use the user ID or other user identifier as a key or index for a user application database 102, which is illustrated as having installation and de-installation times as relevant retention information fields. In FIG. 1D, a transaction-based input model for the application database 100 uses a unique transaction ID as a key or index for a transaction application database 104. In the transaction application database 104, a transaction time/date and a transaction type (e.g., install, delete, upgrade) are recorded as retention information items whenever a user performs the specified transaction.

To obtain application-specific retention metric information, a user selects (200) an application of interest. The application selection 200 then may be transmitted to the application database 100 for determination of the retention metric information. For example, the user may be a user browsing a content catalog application exploring potential software applications of interest for download/purchase. In another example, the user may be a software developer exploring the retention metrics for its own software titles or those of another developer (e.g., using the content catalog application or other application interface for querying the application database 100). In either case, the application database 100 manager may be the content provider for software applications in the content catalog. The user/local (content catalog) application transmits the application selection 200 to the content provider. The content provider receives the application selection 200 from the remote content catalog application (e.g., an application identifier corresponding to the application selection 200 and at least one record in the application database).

The application database 100 manager generates (300) an application-specific retention metric for the application selection 200. Generally, the application identifier provided by the (remote) user is compared to the application identifiers in the application database 100 to generate the application-specific retention metric for the application selection 200. For example, the application database 100 is queried for application identifiers corresponding to the application selection 200 and the returned individual, record-specific retention information items are aggregated in any desired manner to determine the application-specific retention metric. For instance, the aggregated application records may be used to determine the number and/or fraction of instances in which the application selection 200 has been installed and either retained (e.g., a fractional or percent retention) or subsequently deleted (e.g., the complement of the fractional or percent retention). In cases where the application database 100 includes time-dependent retention information data for each application-user combination, the application-specific retention metric additionally may include the number and/or fraction of instances in which the application selection 200 has been retained for at least a selected minimum time period (e.g., at least "x" days, where larger values of x may indicate an application more likely to be found useful and retained by the user) or has been deleted within a selected maximum time period (e.g., within "y" days, where smaller values of y may indicate an application more likely to be found non-useful and discarded by the user). Similarly, the application-specific retention metric additionally may include the number and/or fraction of instances in which the application selection 200 has been retained for at least a selected minimum time period prior to deletion (e.g., retained at least "z" days before deletion, where larger values of z may indicate an application more likely to be found useful and retained by the user, for example where the application has a finite planned cycle life and is expected to be deleted after some period, even if it is a desired/useful application). Any combination(s) of the foregoing metrics may be determined, for example including histograms/ cumulative distributions of the aggregated retention information data (e.g., where different selected time values define bins/boundaries of the distributions, whether for retention, deletion, or a combination of both).

The particular application-specific retention metric(s) generated may be based on a selection by the user (e.g., transmitted along with the application selection 200 or otherwise) and/or determined by the application database 100 manager. For example, the user may request a general fractional retention across all installations of the application selection 200, regardless of the total retention time for each instance of the installed application. Similarly, the application database 100 manager additionally may generate a fractional retention for application instances retained at least 30 days (for example) based on information regarding the life cycle of the application selection 200.

In an embodiment, the application records in the application database 100 are filtered to provide a sub-population of application-user combinations which is desirably more representative of the retention/usefulness of the application selection. For example, some users either choose not to delete or do not know how to delete unused applications. Thus, an installation entry without a corresponding deletion entry in the application database 100 for such users is not necessarily indicative of an application that is actively used by the users. An approach to address this artifact is to select records in the application database 100 with (i) application identifiers corresponding to the application selection 200 and (ii) user identifiers corresponding to users having installed and deleted at least one (other) application. The installed-and-deleted application qualifying the application-user combination for inclusion in the retention metric determination may be the application selection 200 itself or any other application deleted at some point by the user.

Figure 1E:
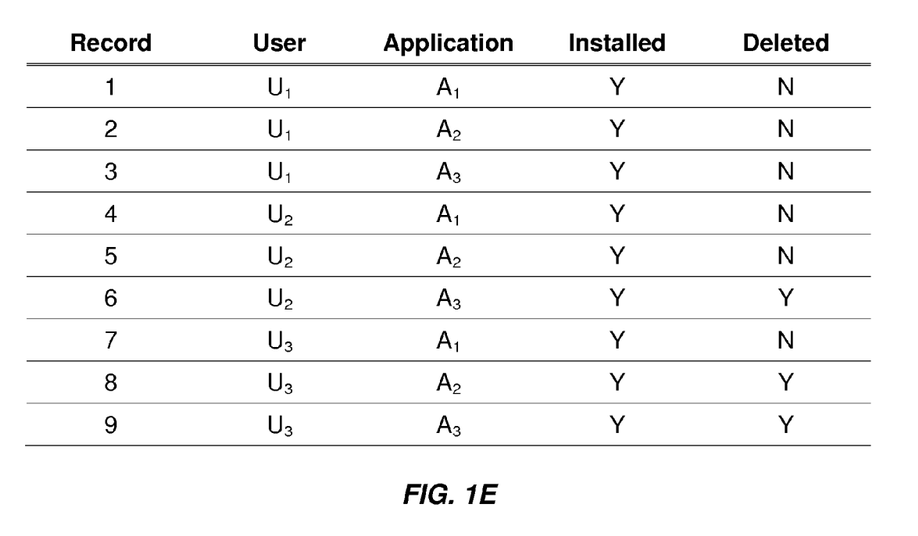

This filtering of the application records is illustrated by the example application database shown in FIG. 1E, The example application database has nine records for three user identifiers ($U_1$-$U_3$) and three application identifiers ($A_1$-$A_3$), which records indicate whether the given application has been installed and/or deleted (e.g., as two items of retention information). User $U_1$ is excluded from the retention metric determination, because the user $U_1$ has never deleted any applications. Users $U_2$ and $U_3$ have deleted at least one application, so their installation/deletion retention metric data are included in the aggregate retention metric determination. Thus, by excluding $U_1$ while including $U_2$ and $U_3$, applications $A_1$, $A_2$, and $A_3$ have aggregate retention metrics of 100%, 50%, and 0%, respectively.

The foregoing filter is a relatively coarse filter based on users having at least one instance of a deleted application. In other examples, additional/different filters and/or weighting factors may be applied to the application database 100 data used to determine the aggregate retention metrics (i.e., in addition to or in place of the coarse filter above). For example, users having deleted at least one paid application may be weighed more heavily in the retention metric determination from the filtered population (e.g., reflecting a hypothesis that users who delete paid applications are more critical users and more likely to delete unused applications).

Similarly, users having deleted many applications (e.g., more than one) may be weighed more heavily in the retention metric determination from the filtered population (e.g., reflecting a hypothesis that users who delete applications routinely with a relatively high frequency are more critical users and more likely to delete unused applications).

The generated application-specific retention metric is then transmitted (400) to the user. The retention metric may be transmitted to the user's computing device, such as within the remote content catalog application thereon (e.g., along with any other descriptive information related to the application selection 200). The retention metric may be delivered to/displayed on the user's computing device in any convenient form, for example in numerical form (e.g., for a single retention number), in tabular form (e.g., for multiple numbers associated with the retention metric), and/or in graphical form (e.g., bar, line, pie, etc. graphs/charts) as appropriate for the particular retention metric selected. As a result of the retention metric and any other information related to the application selection 200, the user may subsequently download/install the application selection 200 to his/her computing device (e.g., personal computer, laptop computer, mobile computing device such as smartphone, tablet computer, music player, etc.).

In some instances, the application retention metric is determined including only data from the application database 100 corresponding to the application of interest as specified by the application selection 200 received by the application database 100 as the remote application identifier. In other instances, the application retention metric is determined including data from the application database 100 corresponding to the application of interest as specified by the application selection 200 and at least one other related application corresponding to the application of interest.

Figure 2A:
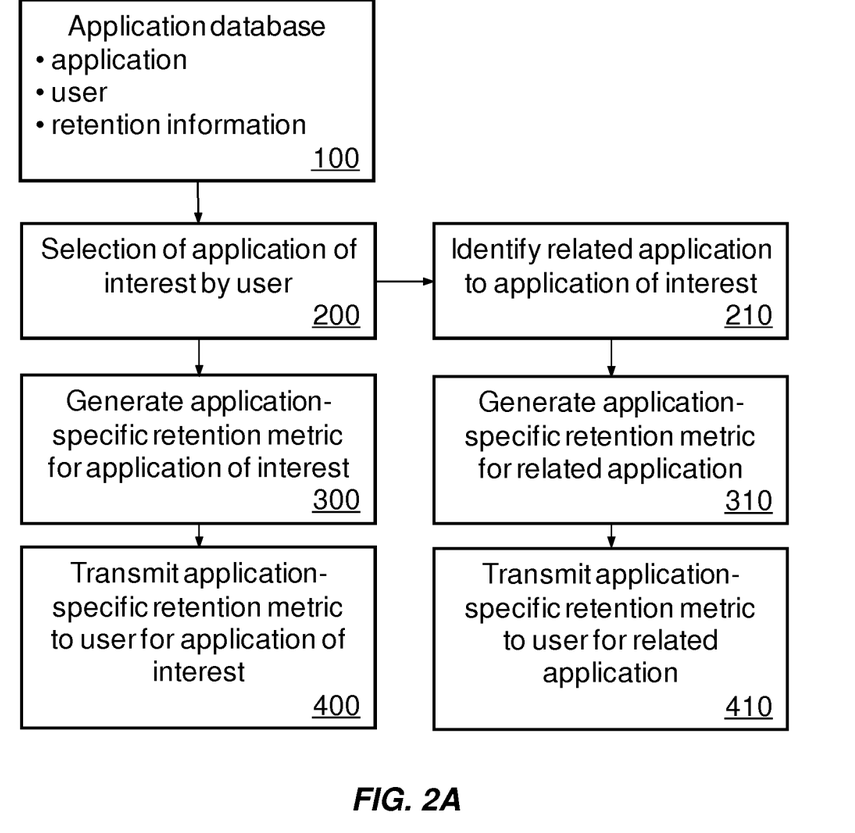
FIGS. 2A and 2B are flowcharts illustrating extensions of a method for determining an application-specific retention metric according to the disclosure.

FIGS. 2A-2B are flowcharts illustrating extensions to the general method of FIG. 1A which incorporate retention data for related applications. The method illustrated in FIG. 2A is analogous to that above described in relation to FIG. 1A, with the exception that an additional application is identified (210), where the additional application 210 is related to the user's application selection 200. The additional application 210 may be a user-selection as well (e.g., selected by the user to provide a side-by-side application comparison). Alternatively, the additional application 210 may be selected by the application database 100 manager based on information that the additional application 210 may be of interest to the user (e.g., based on usage, installation, retention, etc. patterns of other users). Similar to FIG. 1A, an application-specific retention metric may be generated (310) and transmitted (410) to the user for the additional application 210 for comparison with the selected application 200.

Figure 2B:
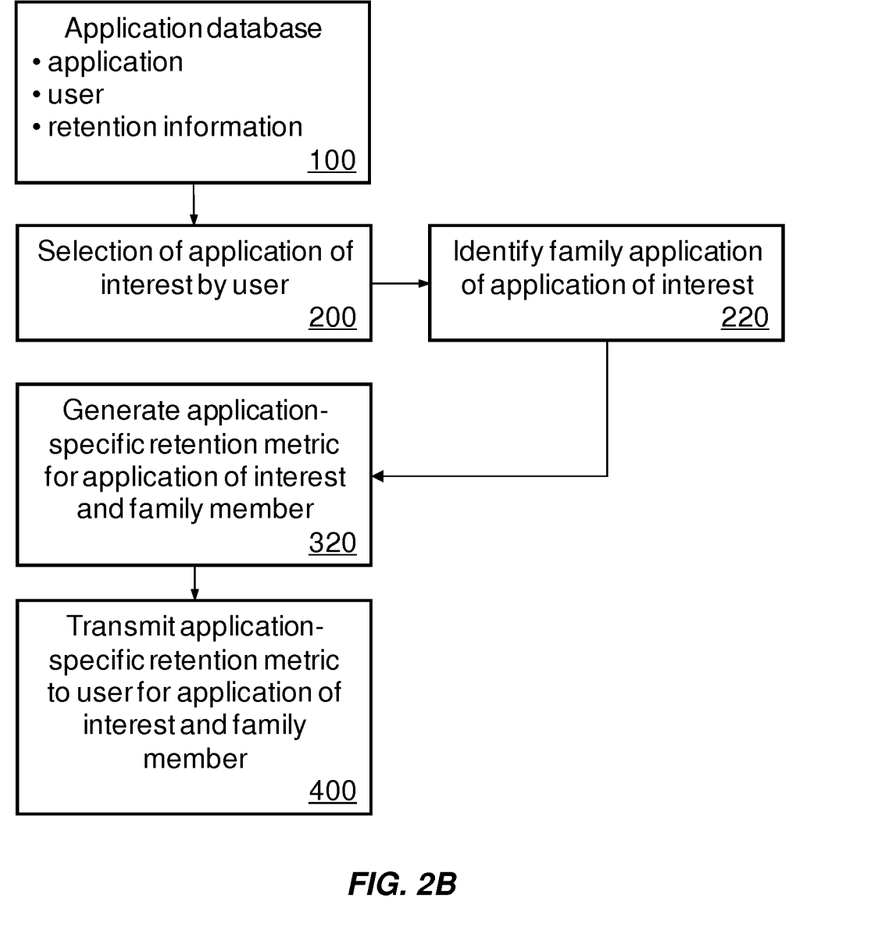

The method illustrated in FIG. 2B is analogous to that above described in relation to FIG. 1A, with the exception that an additional family application (or applications) is identified (220), where the additional application 220 is in the same application family as the user's application selection 200. Similar to above, the additional application 220 may be selected by the user or by the application database 100. In this case, however, a single application-specific retention metric is generated (320) for application identifiers corresponding to the application selection 200 and the additional application 220 application database 100 (e.g., in a disjunctive or conjunctive relationship as described below). The single application-specific retention metric is then transmitted (400) to the user as in FIG. 1A.

Figure 3:
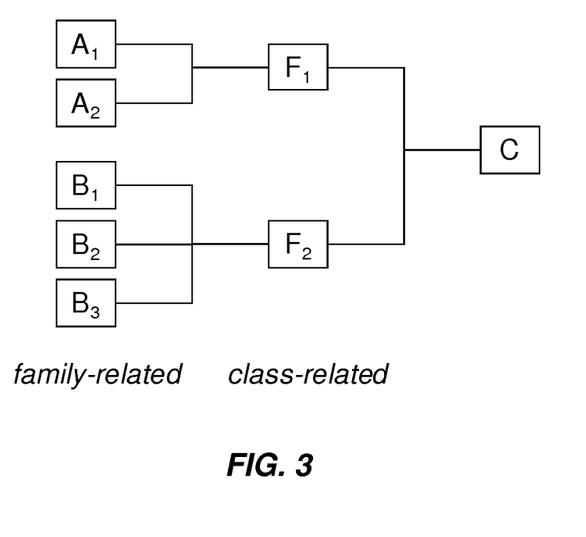
FIG. 3 illustrates family and class relationships for different applications.

FIG. 3 illustrates representative family and class relationships for different applications. In FIG. 3, a single software application class C is illustrated as having two application families $F_1$-$F_2$ (e.g., class members), which in turn contain application family members $A_1$-$A_2$ and $B_1$-$B_3$, respectively. Applications within a single class may have the same or different developer/publisher, but typically have the same or similar general function. Examples of suitable software classes include social media, productivity (general document manipulation such as word processing, spreadsheet, database, web browsing, presentation, etc. including authoring/editing and/or viewing programs), information gathering (news, television (video), radio (audio)), sports (general or sport-specific), entertainment, media delivery or creation (video, audio), games (strategy, sports, role-playing), etc. Applications within a single family may have the same developer/publisher and the same or similar general function. Examples of suitable software family members include free/paid/premium versions of the same application title, different versions/revisions of the same application title; serial installments same application title (e.g., different seasons of sports-based applications or games; chapters/installments of games). Within the context of the illustration of FIG. 3, for example, families $F_1$ and $F_2$ may represent social media applications from different developers. Further, family members $A_1$ and $A_2$ may represent the free and paid versions of the social media application in $F_1$, while $B_1$-$B_3$ may represent versions 1.1, 1.2, and 1.3 of the social media application in $F_2$.

Applying the illustrated application relationships of FIG. 3 to the method of FIG. 2B, a user may select (free social media) application $A_1$ as the selected application 200 of interest. Either the user or the application database 100 manager may then identify (paid social media) application $A_2$ as the identified additional application 220 in the family. In this case, the generated single application-specific retention metric 320 reflects those users who have installed and retained either or both of $A_1$ and $A_2$. Applying this scenario to the example data set in FIG. 1E, the retention metric 320 for $A_1$ and/or $A_2$ is 100% (e.g., basing the determination on $U_2$ and $U_3$ while excluding $U_1$ for lack of any application deletions). Similarly a user selection of application $B_1$ as the selected application 200 of interest may generate a single application-specific retention metric 320 reflecting those users who have installed and retained any or all of $B_1$-$B_3$ as related version numbers of the same application.

In addition to providing information on individual applications, the retention metrics may be aggregated. In an example, an average retention metric is computed for each developer by averaging the retention metric for each application it has developed. In another example, the average metric is computed for a specific developer across along with an additional filter limitation such as, for instance, the economic model used for application revenue generation (e.g., paid application, free application, free application with advertisements, free application with in-application purchases, or combinations thereof). These developer-specific metrics can aid users in selecting applications by guiding the users toward applications by the best-rated developers, and can additionally aid developers by giving additional quantitative performance metrics.

Figure 4A:
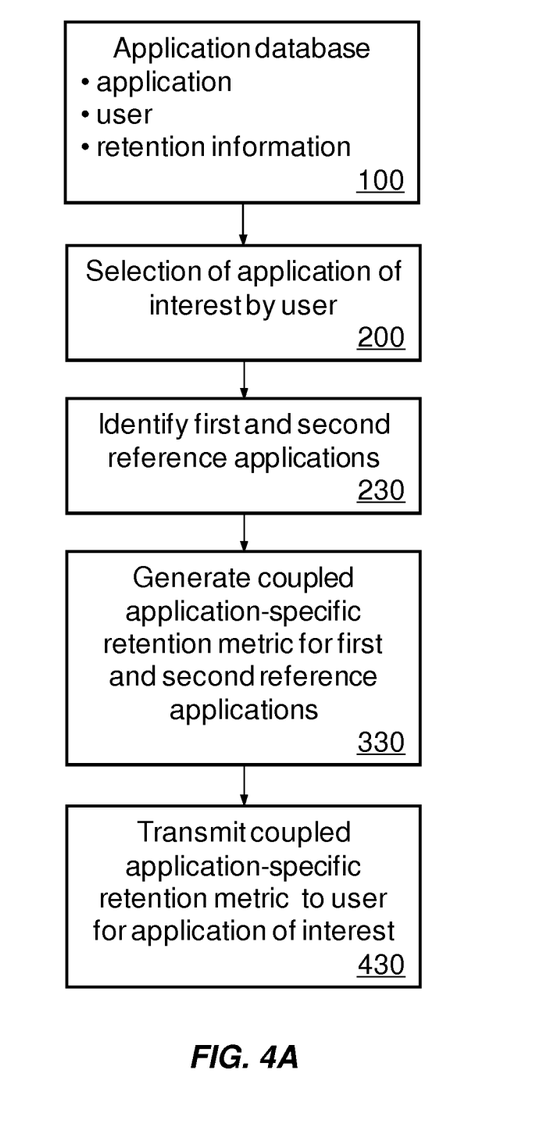
FIGS. 4A and 4B are flowcharts illustrating embodiments of a method for determining a coupled application-specific retention metric according to the disclosure.

FIG. 4A illustrates another aspect of the disclosure as a method for determining a coupled application-specific retention metric. As above with respect to FIG. 1A, an application database 100 includes a plurality of application records, where each application record in the database includes an application identifier, user identifier, and at least one retention information item for the given application-user combination. A user also selects (200) an application of interest, which is transmitted to the application database 100 for determination of the aggregate coupled retention metric information. The application, user, and retention information stored in the application database 100 may be the same or different as that above (e.g., the same or different databases may be used to generate the above aggregate retention metric as well as the aggregate coupled retention metric illustrated in FIG. 4A).

A first reference application identifier 232 and a second reference application identifier 234 are selected (230). The first reference application identifier 232 is suitably selected to correspond to the application selection 200 of the user. The second reference application identifier 234 similarly may be selected by the user (e.g., a second application of interest selected by a user and similarly transmitted to the application database 100 manager from a remote application). In another example, the second reference application identifier 234 may be selected without user input (e.g., by the application database 100 manager/catalog content manager), for example to correspond to at least one other application related to the application selection 200/first reference application identifier 232 (e.g., other application(s) in the same family and/or same class with the same or different developer as the application selection 200).

The application database 100 manager generates (330) a coupled retention metric for the first and second reference application identifiers 232, 234. Generally, the retention information items in the application database are compared (e.g., aggregated) for application identifiers corresponding to the first reference application identifier 232 or the second reference application identifier 234 and having a common user identifier. For example, the application database 100 is queried to identify users that have installed (and possibly subsequently deleted) applications corresponding to both the first and second reference application identifiers 232, 234. In this case, a qualifying application database record for inclusion in the determination of the coupled retention metric contains the first or the second reference application identifier 232, 234, provided that there is another record in the application database 100 with the other application identifier and for the same user identifier (e.g., such that the coupled retention metric is based on a sub-population of users in the application database 100 who have tried/installed both applications of interest).

The returned individual, record-specific retention information items are aggregated in any desired manner to determine the coupled retention metric. Generally, the same logical conditions described above in relation to FIG. 1A may be applied to the coupled retention metric (e.g., number and/or fraction of instances in which an application has been retained in general or for at least a selected minimum time period, has been deleted within a selected maximum time period, has been retained for at least a selected minimum time period prior to deletion, etc., including histograms/cumulative distributions of the same). Suitably, the same logical retention condition is applied to each application being evaluated (e.g., whether the first and second applications 232, 234 have been retained). In other cases, however, different logical retention conditions may be applied to each application being evaluated (e.g., whether the first application 232 has been retained for at least 60 days and whether the second application 234 has been retained for at least 30 days). Because the coupled retention metric involves retention information for at least two applications (e.g., the first and the second reference application identifier 232, 234, in addition to other (related) applications), the coupled retention metric may be expressed as a matrix based on the number of applications being considered (e.g., 2 or more) and the number of outcomes for the logical retention condition being considered (e.g., generally 2, but possibly more for more detailed retention query conditions).

Figure 5A:
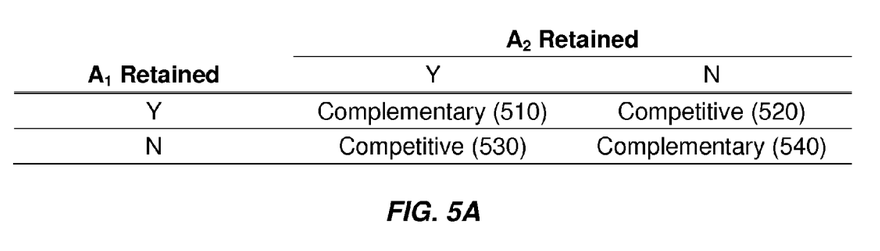
FIG. 5A is a table illustrating a coupled application-specific retention metric according to the disclosure.

FIG. 5A is a table illustrating an example coupled retention metric matrix according to the disclosure. In FIG. 5A, two software applications $A_1$ and $A_2$ are evaluated for the logical condition of whether each application has been installed and retained by the same user. When a user retains both applications, a positive complementary relationship 510 is suggested by the data point (e.g., users retaining $A_1$ are similarly likely to retain $A_2$ and vice versa). When a user deletes both applications, a negative complementary relationship 540 is suggested by the data point (e.g., users deleting $A_1$ are similarly likely to delete $A_2$ and vice versa). When a user retains one application and deletes the other application, a competitive relationship 520 or 530 is suggested by the data point. For example, the competitive relationship 520 is positive for $A_1$ and negative for $A_2$ (e.g., users trying both $A_1$ and $A_2$ are likely to retain $A_1$ and delete $A_2$). Similarly, the competitive relationship 530 is negative for $A_1$ and positive for $A_2$ (e.g., users trying both $A_1$ and $A_2$ are likely to delete $A_1$ and retain $A_2$). The aggregation of all individual coupled retention metric data points from the application database 100 may be used to express the various relationships 510, 520, 530, and 540 as fractions/percentages relative to the user population considered to generate the coupled retention metric.

Figure 5B:
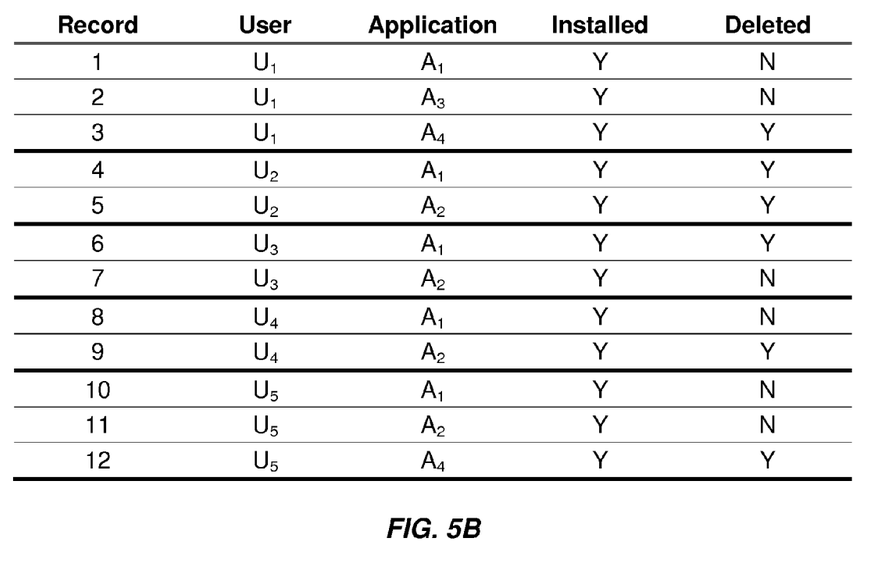
FIG. 5B is an illustration of an example application database according to the disclosure
Figure 5C:
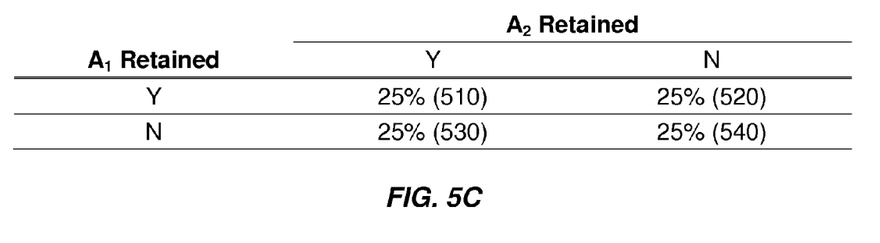
FIG. 5C is a table illustrating a coupled application-specific retention metric aggregate matrix according to the disclosure.

FIG. 5B is analogous to FIG. 1E and illustrates an example application database for determining a coupled retention metric. The example application database has 12 records for five user identifiers ($U_1$-$U_5$) and four application identifiers ($A_1$-$A_4$), which records indicate whether the given application has been installed and/or deleted by a given user (e.g., as retention fields 1 and 2). Continuing the example from FIG. 5A, when determining the coupled retention metric for two software applications $A_1$ and $A_2$, only users $U_2$-$U_5$ are considered as they are the only users who have at least installed both applications $A_1$ and $A_2$ of interest. From the considered users, one user ($U_5$) retains both $A_1$ and $A_2$, one user ($U_2$) deletes both $A_1$ and $A_2$, one user ($U_4$) retains $A_1$ but deletes $A_2$, and one user ($U_3$) deletes $A_1$ but retains $A_2$. Expressed as a percent relative to the considered user population of four, each of the four relationships 510, 520, 530, and 540 has an occurrence rate/value of 25% in the coupled retention metric matrix, as illustrated in FIG. 5C. Of course, when the sample size of common users is large enough to generate statistically significant results, a non-uniform distribution from among the coupled retention metric matrix entries can provide inferences and/or recommendations to a user regarding the considered applications (e.g., the relationships 510, 520, 530, and 540 may be expressed as relatively more or less likely based on the aggregated data).

In the same manner as described above in relation to FIGS. 1A and 1E, the application records in the application database 100 may be filtered and/or weighted to provide a sub-population of application-user combinations which is desirably more representative of the retention/usefulness of the selected first and second reference applications 232, 234. For example, in addition to selecting records having a common user for both selected applications, the records may be further filtered based on users having installed and deleted at least one (other) application. Applying this additional filter to the example described above for FIGS. 5A-5C does not change the result, insofar as all users in the example database of FIG. 5B have deleted at least one application.

In some instances, the coupled retention metric is determined including only data from the application database 100 corresponding to the application(s) of interest corresponding to the first reference application identifier 232 and/or the second reference application identifier 234. In other instances, the coupled retention metric is determined including data from the application database 100 corresponding to the application of interest(s) corresponding to the first reference application identifier 232 and/or the second reference application identifier 234 at least one other related application corresponding to the first and/or second application 232, 234 (e.g., in a related family or class as described above and illustrated in FIG. 3). For example, in the context of the relationships illustrated in FIG. 3, a coupled retention metric may be determined based on the common user population of (i) users having installed/retained $A_1$ and/or $A_2$ (e.g., related applications in a family and corresponding to the first reference application identifier 232) and (ii) users having installed/retained $B_1$, $B_2$, and/or $B_3$ (e.g., related applications in a family and corresponding to the first reference application identifier 234).

The first and second reference applications 232, 234 may be selected to correspond to different applications in the same application family. In this way, the coupled retention metric may identify competitive or complementary relationships between applications in the same family, for example to identify migration/upgrade/downgrade patterns. For instance, if the first and second reference applications 232, 234 are selected to represent version 1.0 and version 2.0 of the same software title, a competitive coupled retention metric may indicate that users tend to retain version 1.0 without upgrading to version 2.0 or after trying and downgrading from version 2.0 (e.g., when the competitive metric favors version 1.0) or that users tend to upgrade to version 2.0 without retaining version 1.0 (e.g., when the competitive metric favors version 2.0). A positive complementary coupled retention metric may indicate that users tend to retain versions 1.0 and 2.0 (e.g., where each version contains some functionality not found in the other). Similarly, a negative complementary coupled retention metric may indicate that users tend to delete both versions 1.0 and 2.0.

In other cases, the first and second reference applications 232, 234 may be selected to correspond to different applications in the same application class (e.g., but in different families, such as with different developers). In this way, the coupled retention metric may identify competitive or complementary relationships between applications in the same class, for example to identify migration patterns. For instance, if the first and second reference applications 232, 234 are selected to represent software titles from different developers but having the same class/general functionality, the coupled retention metric may identify competitive and/or complementary relationships between the two developers.

In an aspect, the retention information in the application database 100 additionally includes at least one time component (e.g., date of installation, date of un-installation/deletion). In this way, a timing/temporal filter may be applied to the application database 100 when identifying the common user population, and the resulting coupled retention metric may have a time-dependent component (e.g., to identify a time-dependent migration relationship between the first and second reference applications 232, 234). For example, if $A_1$ and $A_2$ represent the first and second reference applications 232, 234, respectively, the common user population may be limited to users that install $A_1$ prior to $A_2$. As above, $A_1$ and $A_2$ may be related, such as within the same family or within the same class. In any case, a competitive coupled retention metric favoring $A_1$ may reflect a situation in which a user is more likely to retain the first application installed of a given type, even if the user would have been satisfied with a different application if installed first (e.g., representing a situation where different applications are functionally equivalent or very similar such that the barrier/expense of migration/upgrade deters a user from deviating from his/her first choice).

As generally described above, the coupled retention metric may be determined as between two (groups of) applications (e.g., the first reference application 232 possibly in addition to at least one related application, and/or the first second reference application 234 possibly in addition to at least one related application). In other cases, the coupled retention metric may be determined between three or more (groups of) applications as desired. In such cases, the coupled retention metric matrix has a higher order depending on the number of (groups of) applications N being considered (e.g., $2^N$ for logical retention conditions having two states). For example, a coupled retention metric determined between applications $A_1$, $A_2$, and $A_3$ from three different developers results in a ternary coupled retention metric matrix (e.g., a 2×2×2 matrix analogous to the binary coupled retention metric matrix illustrated in FIG. 5C).

Once generated, the coupled application retention metric between the first and the second reference application identifiers 232, 234 is transmitted (430) to the user. In addition to the coupled application retention metric itself (e.g., as a matrix or as at least one element of the matrix), any (positive or negative) competitive or complementary relationships between the first and second applications 232, 234 may be identified and transmitted to the user. Such relationships may be expressed in numerical form (e.g., "85% of users installing both $A_1$ and $A_2$ retained both applications") or in descriptive form (e.g., "most users installing both $A_1$ and $A_2$ retained only $A_1$ and eventually deleted $A_2$"). As above, the coupled retention metric may be transmitted to the user within the remote content catalog application, delivered to/displayed on the user's computing device in any convenient form, and/or used by the user to subsequently download/install either or both of the first and second applications 232, 234 to his/her computing device.

Figure 4B:
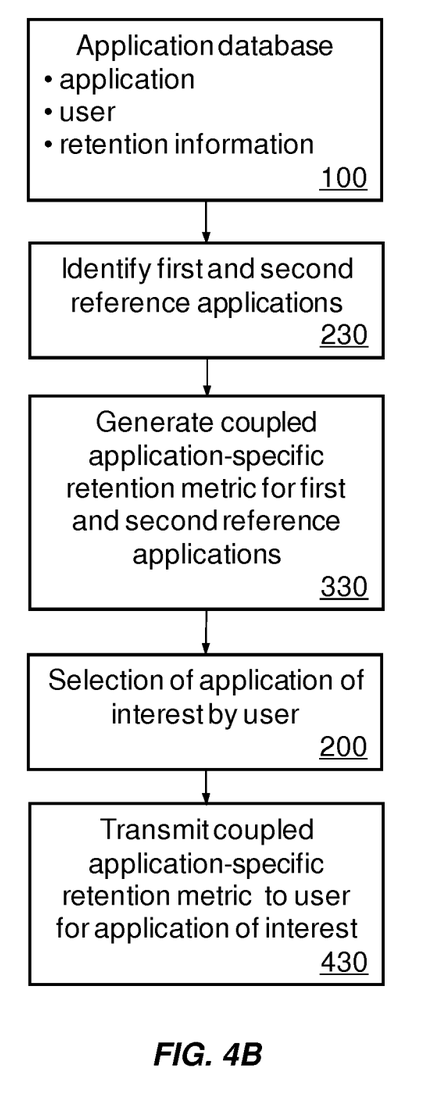

FIG. 4B is analogous to FIG. 4A. The two figures illustrate that the application selection 200, the first and second reference application identification 230, and the coupled retention metric generation 330 may be performed in any desired order. For example, in FIG. 4A, the application selection 200 is made prior to the first and second reference application identification 230 and the coupled retention metric generation 330. In this case, the coupled retention metric may be computed/determined after application selection 200, such that the coupled retention metric may reflect the most current version of information in the application database 100 as well as any instance-specific parameters for the determination (e.g., the inclusion of other related applications in the determination; selection of specific logical retention conditions; selection of specific filters and/or weight factors; whether specified by the user or selected by the application database 100 manager). In FIG. 4B, the application selection 200 is made subsequent to the first and second reference application identification 230 and the coupled retention metric generation 330. In this case, the application database 100 may include a plurality of pre-calculated coupled retention metrics (e.g., pre-calculated on a periodic basis or an event-driven basis) for a variety of application combinations such that the application selection 200 allows look-up and transmission (430) of a pre-generated coupled retention metric (e.g., assuming that any other desired instance-specific determination parameters have been incorporated into the prior calculation). For example, the application database 100 may include or may be associated with/coupled to a retention metric database 110 and/or a coupled retention metric database 120 as described below.

In an aspect, the disclosure also relates to methods for receiving (coupled) application retention metrics on a suitably programmed device. As applied to the client/user side of the above-described methods, a client-side computing device may receive a user input for the application selection 200 (e.g., which may correspond to the first reference application reference 232 as above). The application selection 200 is used to query the application database 100 such that the desired (coupled) retention metric(s) may be remotely generated and transmitted to/received by the client-side computing device. The user is then notified of the (coupled) retention metric(s), such as by displaying the metric(s) on a display of the computing device.

Figure 6:
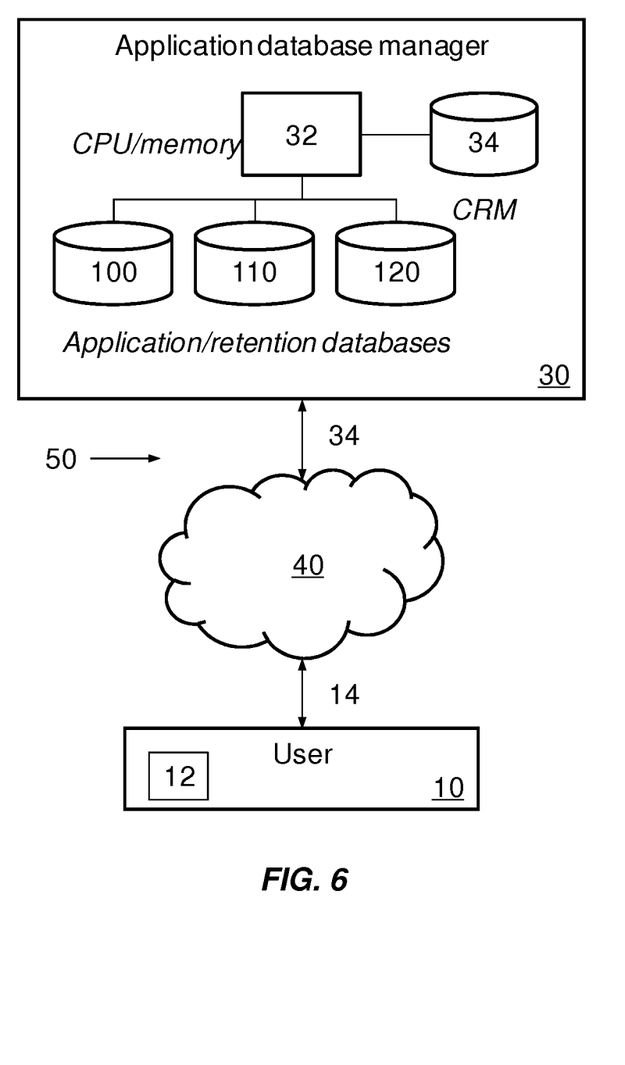
FIG. 6 is a diagram illustrating example systems and apparatus for use with and for performance of elements of the disclosed methods.

FIG. 6 shows a system 50 for generating retention metrics according to the disclosure (e.g., coupled or uncoupled retention metrics as desired). In the system 50, at least one user 10 and an application database manager 30 (e.g., a software application content provider) interact with each other. The user 10 and the manager 30 may be remotely located relative to each other and may communicate electronically over a network or networks 40. The networks 40 may include a private network such as an intranet, a public network such as the internet, or a combination of multiple interconnected public and/or private networks. Connections 14 and 34 represent wired and/or wireless connections for the user 10 and the manager 30, respectively, to the networks 40, which connections 14 and 34 permit electronic communication/interaction between any parties in the system 50 (e.g., including multiple users). For example, connections 14 and 34 permit user-manager communication (e.g., submission/receipt of a user selection for application(s) of interest; transmission/receipt of at least one (coupled) retention metric related to the application(s) of interest).

The manager 30 includes at least one computer 32 (e.g., general purpose computer including a suitable processor coupled to memory, storage media, etc.) coupled to computer-readable media 34 (e.g., containing instructions for generating retention metrics) and to at least one database for storing application retention information (e.g., application database 100).

The user 10 includes at least one computing device 12 to interface with the manager 30 and send/receive retention metric selection and result information. The computing device 12 may be a personal computer, a laptop computer, a mobile computing device such as smartphone, tablet computer, music player, etc. In some cases, the computing device 12 corresponds to a hardware platform applicable to application(s) in the application database 100 and/or provided by the content manager 30 (e.g., such that a user may download and install queried applications to his/her computing device 12 after receiving the retention metric information). In other cases, the computing device 12 need not correspond to a hardware platform applicable to application(s) in the application database 100 and/or provided by the content manager 30 (e.g., a general computer interface permitting a user receive retention metric information for a hardware platform other than that of the computing device 12).

In one aspect, the disclosure relates to the computer-readable media 34 with instructions for generating retention metrics. The media 34 may include or be coupled to an application database 100 with corresponding application, user, and retention metric records. The media 34 contains stored instructions which, when executed by the at least one computer 32 coupled to the media 34, cause the computer(s) 32 to perform various retention metric operations. For example, the computer(s) 32 may: receive from a remote content catalog application information comprising a remote application identifier selected by a user of the remote content catalog application and corresponding to an application of interest; compare the remote application identifier to the application identifier in the application database for user identifiers corresponding to users having installed and deleted at least one application to generate an application retention metric for the remote application identifier based on the retention metric in the application database; and transmit to the user in the remote content catalog application the application retention metric. Similarly, the computer(s) 32 may: select a first reference application identifier and a second reference application identifier; generate a coupled application retention metric between the first and the second reference application identifiers (e.g., by comparing the retention metrics in the application database for application identifiers corresponding to the first reference application identifier or the second reference application identifier and having a common user identifier); receive from a remote application information comprising an application of interest selected by a user of the remote application and corresponding to the first reference application identifier; and transmit to the user the coupled application retention metric between the first and the second reference application identifiers.

The computation of all the aforementioned metrics may be performed offline. For example, the metrics may be recomputed every evening. The affected application retention metrics may be recomputed incrementally, such as each time a user performs a transaction (e.g., deleting or installing an application). The metrics also may be computed in real-time or on-demand, for example when a request is received for a given application identifier (e.g., at which time the system may compute the retention metric).

The retention metrics, whenever computed (e.g., interval-basis, transaction-basis, real-time, on-demand, etc.), may be stored in a retention metric database containing user-independent, aggregated retention information to facilitate rapid look-up of a particular retention metric at some point after computation. As illustrated in FIG. 6, for example, the application database 100 may include or may be associated with/coupled to a retention metric database 110 and/or a coupled retention metric database 120, which in turn may be coupled to the computer 32 and media 34. The retention metric database 110 includes an application identifier as well as the corresponding application-specific aggregated retention metric. Multiple aggregated retention metrics may be stored in the retention metric database 110 (e.g., fraction of users retaining an application for 30-60 days, fraction of users retaining an application for over 60 days, etc.). The coupled retention metric database 120 includes at least two application identifiers as well as the corresponding application-specific aggregated coupled retention metric. Multiple aggregated coupled retention metrics may be stored in the coupled retention metric database 120 for a given multi-application combination (e.g., fraction of users retaining application A and application B, fraction of users deleting application A and application B, fraction of users retaining application A but deleting application B, fraction of users deleting application A but retaining application B, etc.). In the case of the coupled retention metrics, in a refinement, the system may retain for each first application, only those metrics for second applications which exceed a certain threshold, or retain only a pre-selected number of second applications having the most (statistically) significant results for the coupled retention metric.

In another aspect, the disclosure relates to the system 50 for generating a retention metric. In this aspect, the system 50 may include the at least one computer 32, which is coupled to the computer-readable media 34 as described above. The specific computer(s) 32 usable in the system 50 are not particularly limited and may include, for example, digital computers, such as laptops, desktops, workstations, servers, blade servers, mainframes, and other appropriate computers.

Throughout the specification, where the methods, processes, systems, or apparatus are described as including components or steps, it is contemplated that the methods, processes, systems, or apparatus may also comprise, consist essentially of, or consist of, any combination of the recited components or steps, unless described otherwise.

We claim:

1. A method for generating a coupled application retention metric, the method comprising:
   selecting (230) a first reference application identifier and a second reference application identifier;
   generating (330) a coupled application retention metric between the first and the second reference application identifiers, comprising:
   querying (100) an application database comprising a plurality of application records, each comprising an application identifier, a user identifier, and retention information;
   comparing the retention information in the application database (100) for application identifiers corresponding to the first reference application identifier or the second reference application identifier and having a common user identifier;
   receiving (200) from a remote application an identifier for an application of interest selected by a user of the remote application and corresponding to the first reference application identifier; and
   transmitting (430) to the user the coupled application retention metric between the first and the second reference application identifiers.

2. The method of claim 1, wherein the first and the second reference application identifiers correspond to applications in a single application family.

3. The method of claim 1, wherein the first and the second reference application identifiers correspond to applications in a single application class.

4. The method of claim 1, further comprising:
   identifying a competitive relationship between the first reference application identifier and the second reference application identifier.

5. The method of claim 1, further comprising:
   identifying a complementary relationship between the first reference application identifier and the second reference application identifier.

6. The method of claim 1, further comprising:
   identifying a time-dependent migration relationship between the first reference application identifier and the second reference application identifier.

7. The method of claim 1, wherein the coupled application retention metric is based on users having installed and deleted at least one other application.

8. The method of claim 1, wherein the coupled application retention metric is based on applications corresponding to the first reference application identifier or the second reference application identifier, and at least one other family application corresponding the first reference application identifier or the second reference application identifier.

9. The method of claim 1, wherein:

the remote application is a content catalog application; and the coupled application retention metric is transmitted to the user in the remote content catalog application.

10. A non-transitory computer readable storage medium (34) encoded with a computer program, the program comprising instructions that, when executed by a processor (32), causes the processor (32) to:

select (230) a first reference application identifier and a second reference application identifier;

generate (330) a coupled application retention metric between the first and the second reference application identifiers, comprising:

compare retention information in an application database (100) for application identifiers corresponding to the first reference application identifier or the second reference application identifier and having a common user identifier, the application database (100) comprising application records comprising an application identifier, a user identifier, and retention information;

store the coupled application retention metric in a computer readable storage medium (120);

receive from a remote application an identifier for an application of interest selected by a user of the remote application and corresponding to the first reference application identifier; and transmit (430) to the user the coupled application retention metric between the first and the second reference application identifiers.

11. The non-transitory computer readable storage medium (34) of claim 10, wherein the encoded computer program further comprises instructions that, when executed by a processor (32), cause the processor (32) to:

identify at least one of a competitive relationship, a complementary relationship, and a time-dependent migration relationship between the first reference application identifier and the second reference application identifier; and transmit to the user the at least one identified relationship between the first and the second reference application identifiers.

* * * * *